United States Patent [19]

Iwasaki

[11] Patent Number: 4,926,441
[45] Date of Patent: May 15, 1990

[54] PHASE-SHIFT-KEYING TRANSMITTER
[75] Inventor: Satoshi Iwasaki, Tokyo, Japan
[73] Assignee: Pioneer Electronic Corporation, Tokyo, Japan
[21] Appl. No.: 123,459
[22] Filed: Nov. 20, 1987
[30] Foreign Application Priority Data Nov. 20, 1986 [JP] Japan ................. 61-277502

[51] Int. Cl.$^5$ ............................................. H04L 25/49
[52] U.S. Cl. ......................................... 375/60; 375/67; 375/68; 455/116
[58] Field of Search ............... 332/17, 10, 31, 41; 375/67, 52, 86, 57, 60, 68; 455/112, 111, 110, 208, 212, 216, 116, 113

[56] References Cited
U.S. PATENT DOCUMENTS

| | | | |
|---|---|---|---|
| 3,144,608 | 8/1964 | Warring | 375/57 |
| 4,217,467 | 8/1980 | Kobayashi et al. | 332/41 |
| 4,485,478 | 11/1984 | Takada | 375/60 |
| 4,540,957 | 9/1985 | Hanna | 332/17 |
| 4,633,510 | 12/1986 | Suzuki et al. | 375/60 |
| 4,706,262 | 11/1987 | Ohta | 375/60 |
| 4,739,288 | 4/1988 | Ide et al. | 455/112 |

OTHER PUBLICATIONS

"Hotel Two-Way CATV System", National Technical Report, vol. 32, No. 3, Jun., 1986, pp. 52+, by Minagawa et al.

Primary Examiner—Benedict V. Safourek
Assistant Examiner—Marianne Huseman
Attorney, Agent, or Firm—Sughrue, Mion, Zinn, Macpeak & Seas

[57] ABSTRACT

An improved PSK transmitter such as may be used in a CATV system in the up-link from terminal units to a center having a simple arrangement for switching ON and OFF the PSK carrier signal. An oscillator produces a oscillation output signal at a frequency twice that of the desired carrier frequency. The output of the oscillator is then frequency divided by an element such as a T-type flip-flop, the operation of which is switched ON and OFF by a control signal.

6 Claims, 4 Drawing Sheets

PHASE-SHIFT-KEYING TRANSMITTER

BACKGROUND OF THE INVENTION

The present invention relates to a PSK (phase-shift-keying) transmitter used for a CATV (community antenna television) system or the like, and more particularly to a PSK transmitter in which a sufficient DU ratio (desired-to-undesired signal ratio) can be obtained.

Conventionally known is a PSK transmitter in which a PSK modulation system is employed for transmitting various information. FIG. 1 shows the arrangement of the conventional PSK transmitter for PSK communications. In FIG. 1, reference numeral 1 designates an oscillator circuit having a PSK carrier frequency, 2 designates an amplifier for amplifying the carrier generated by the oscillator circuit 1, and 3 designates a PSK-modulated data signal to be transmitted. Reference numeral 4 designates a switching signal for ON/OFF controlling a switching circuit 8 described below, 5 designates a control circuit constituted by a CPU (central processor unit) for generating the data 3 and the switching signal 4, and 6 designates a PSK modulator for PSK-modulating the carrier generated by the oscillator circuit 1 and amplified by the amplifier 2, with the data 3 generated by the control circuit 5. Reference numeral 7 designates an amplifier for amplifying the PSK-modulated signal which has been PSK-modulated by the PSK modulator 6, 8 designates a switching circuit which is turned on/off in accordance with the state of the switching signal 4 for permitting/inhibiting passage of the PSK-modulated signal from the PSK modulator 6 amplified by the amplifier 7, 9 designates a bandpass filter for passing only signals having a frequency approximate to that of the PSK-modulated signal passed through the bandpass filter 9.

In the thus-arranged PSK transmitter, a carrier of a frequency $f_c$ generated by the oscillator circuit 1 is amplified by the amplifier 2 to a required level, and then is applied to the PSK modulator 6. The PSK modulator 6, employing a two-phase PSK modulation system, modulates the carrier $f_c$ with the data 3 generated by the control circuit 5. As a result, the carrier is modulated so as to be inverted in phase by 180 degrees at the leading and trailing edges of the data 3 as shown in FIG. 2, and the modulated signal is outputted as a PSK-modulated signal. This PSK modulated signal is further amplified by the amplifier 7 to a required level and is applied to the switching circuit 8 controlled in accordance with the switching signal 4 produced by the control circuit 5. As shown in FIG. 3, the switching circuit 8 is turned off to cut off the PSK-modulated signal applied thereto when the switching signal 4 has a level $V_L(0)$ and is turned on to pass the PSK-modulated signal for periods ($T_1$-$T_2$ and $T_3$-$T_4$) when the switching signal 4 has a level $V_H(1)$, thereby to control the transmission of the PSK-modulated signal. The output of the switching circuit 8 is subjected to attenuation ATT1 when in the on-state for minimal relative loss so as to have substantially the same level as an input signal received by the switching circuit 8. The output signal of the switching circuit 8 which has been subjected to the off-state-attenuation ATT2 or the on-state-attenuation ATT1 is limited in frequency band by the bandpass filter 9 and is applied to the output terminal 10.

In such a PSK transmitter, it is necessary to set a differential DU (desired to undesired signal) ratio between the on-state-attenuation ATT1 and the off-state-attenuation ATT2 so as to prevent signal reception from being carried out in the PSK receiver when the switching circuit 8 is in the off state. The DU ratio is obtained by the following inequality:

$$D/U > V_i + 10 \log n - V_{min} \text{ (dB)}$$

where $V_{min}$ represents the minimum reception sensitivity (dBμ) of the PSK receiver, $V_i$ represents the maximum level (dBμ) of the carrier received by the PSK receiver from the PSK transmitter, and n represents the number of PSK transmitters.

FIG. 4 shows the relationship between the DU ratio and the number of PSK transmitters, with the minimum reception sensitivity $V_{min}$ of a PSK receiver fixed because the minimum reception sensitivity $V_{min}$ is generally considered to be about 50 dBμ. The DU ratio and the number of PSK transmitters are represented by the ordinate and the abscissa, respectively. As seen from FIG. 4, the larger the maximum carrier reception level $V_i$ in the PSK receiver, the larger the required DU ratio, and the larger the number n of PSK transmitters n, the larger the required DU ratio.

An example of a PSK communication system using a plurality of PSK transmitters and a single PSK receiver as described above is a CATV system using a PSK receiver provided at the head end (center) and PSK transmitters respectively provided at the various customer terminals. In a CATV system having several tens of thousands of terminals, the terminals are arranged in groups of hundreds of terminals or thousands of terminals, and a switching circuit is provided for every group. In a CATV system having a relatively small number of terminals, however, the terminals are not grouped, and therefore the switching circuit 8 of the PSK transmitter is required to maintain a DU ratio as shown in FIG. 4.

It is generally considered that the minimum reception sensitivity $V_{min}$ and the maximum carrier reception level $V_i$ of a PSK receiver are set to about 50 dBμ and 100 dBμ, with the number of PSK transmitters being about 3000. In this case, the DU ratio in the switching circuit 8 is required to be no less than 84.77 dB. However, it is difficult to easily and inexpensively realize a switching circuit having such a property, which is a heretofore unresolved problem in the conventional PSK transmitter.

SUMMARY OF THE INVENTION

Because the conventional PSK transmitter is arranged so that a switching circuit is provided for switching the PSK-modulated signal directly, the problem described above inevitably results. To overcome this problem, in the present invention an oscillation frequency $f_{osc}$ of an oscillator circuit is set to be different from a PSK carrier frequency $f_c$, then oscillation frequency conversion is performed so as to obtain the PSK carrier frequency $f_c$ and to ON-OFF control a frequency conversion circuit to thereby obtain a sufficient DU ratio.

DESCRIPTION OF THE PREFERRED EMBODIMENTS

Figure 1:
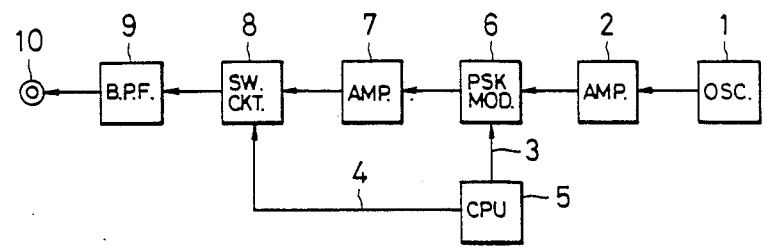
FIG. 1 is a block diagram showing the arrangement of a conventional PSK transmitter.
Figure 2:
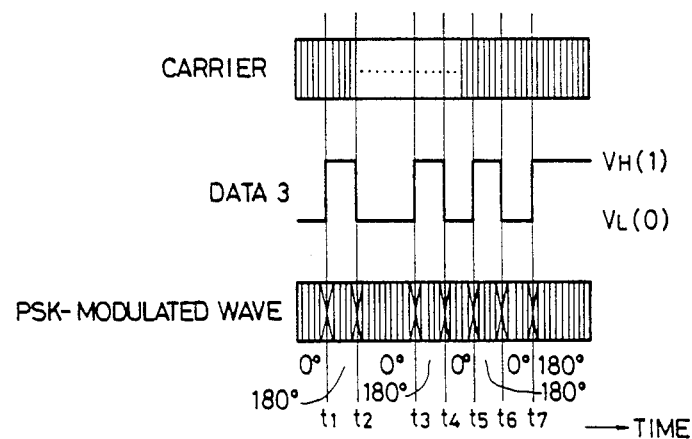
FIGS. 2 and 3 are diagrams of waveforms at main points in the circuit of FIG. 1.
Figure 3:
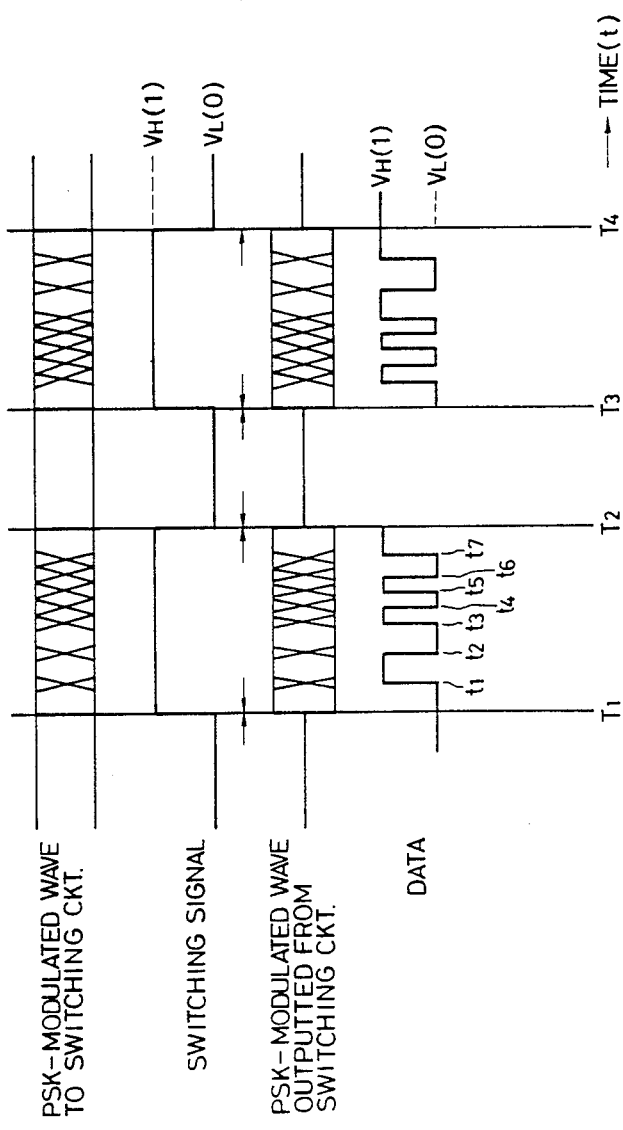
Figure 4:
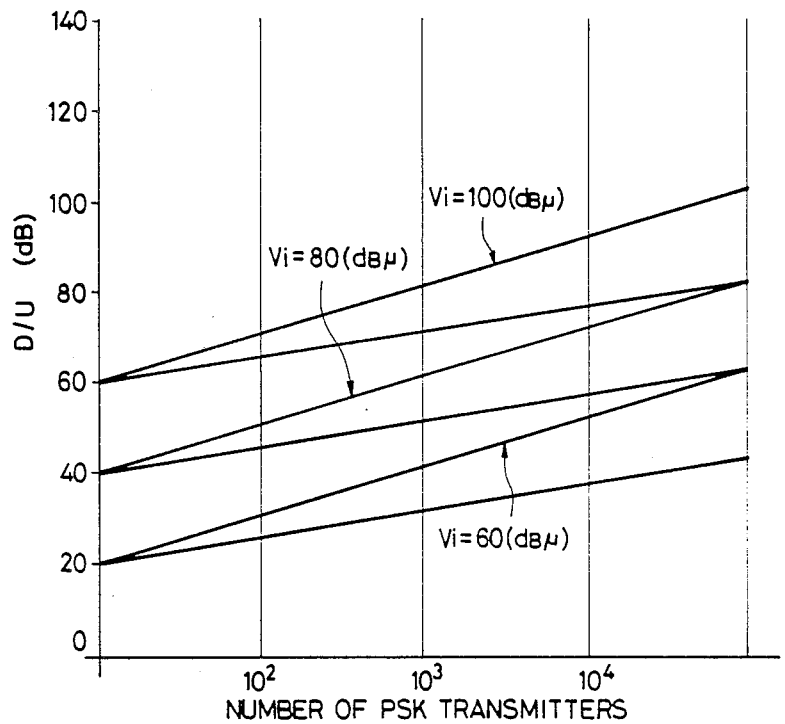
FIG. 4 is a graph for obtaining the DU ratio on the basis of the relational factors.
Figure 5:
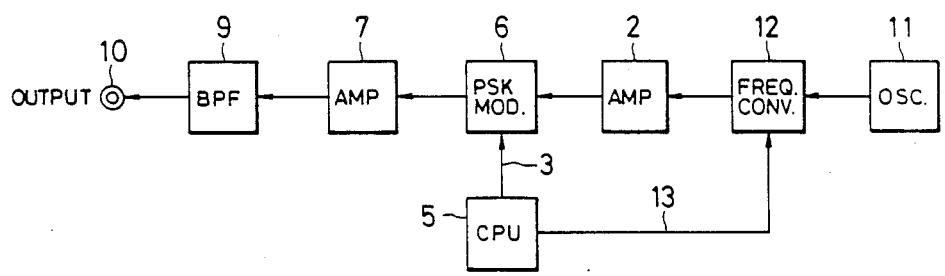
FIG. 5 is a block diagram showing a preferred embodiment of a PSK transmitter constructed according to the present invention.

A preferred embodiment of the present invention will now be described with reference to the accompanying drawings. In FIG. 5, components which are the same as those of FIG. 1 are referenced with the same numerals. Also in FIG. 5, numeral 11 designates an oscillator circuit for generating a signal of frequency $f_{osc}$ twice as high as the carrier frequency $f_c$, 12 designates a frequency converter circuit constituted by a frequency divider for halving the frequency $f_{osc}$ generated by the oscillator circuit 11, and 13 designates a switching signal for ON/OFF controlling the frequency divider of the frequency converter circuit 12, the switching signal 13 being supplied from the control circuit 5. The frequency divider generally can be constituted by a T-type flip-flop.

Figure 6:
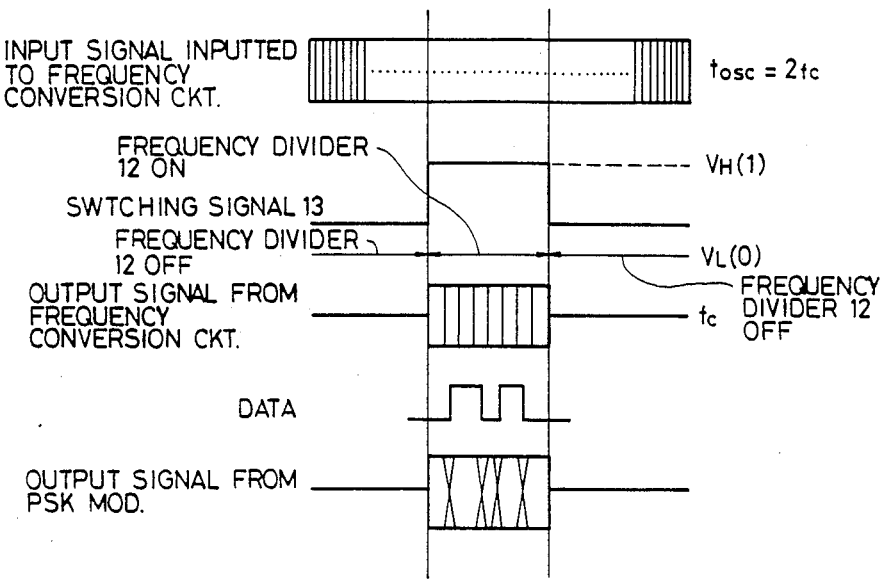
FIG. 6 is a diagram showing waveforms at main points in the circuit of FIG. 5.

In the thus-arranged PSK transmitter, a signal of the oscillation frequency $f_{osc}$ generated by the oscillator circuit 11 is subjected to $\frac{1}{2}$ frequency division by the frequency converter circuit 12 to thereby produce a carrier of the frequency $f_c$. The frequency converter circuit 12 is ON/OFF controlled by the switching signal 13 so that the circuit 12 performs frequency conversion to carry out the $\frac{1}{2}$ frequency division in the on state, while it does not perform the frequency conversion and does not produce the carrier frequency $f_c$ in the off state. That is, as shown in FIG. 6, the frequency converter circuit 12 is set in the off state so as not to produce the carrier frequency $f_c$ when the level of the switching signal 13 is $V_L(0)$, while, on the contrary, the frequency converter circuit 12 is in the on state to effect frequency conversion to halve the input oscillation frequency $f_{osc}$ and produce the carrier signal of frequency $f_c$ at the output thereof when the level of switching signal 13 is $V_H(1)$. The carrier produced by the frequency converter circuit 12 is amplified by the amplifier 2 to a required level and then is applied to the PSK modulator circuit 6. The carrier received by the PSK modulator circuit 6 is PSK-modulated by the data signal 3 generated by the control circuit 5, and the thus-produced PSK-modulated signal is transmitted. The PSK modulated signal is applied to the amplifier 7 so as to adjust it to the required level, passed through the bandpass filter 9 to limit frequency band of the signal, and then applied to the output terminal 10. The signal 13 and data 3 can simply have a relationship as that of the signal 4 and data 3 in FIGS. 1-4, as the ON/OFF of the frequency divider 12 is intended to replace the switching circuit 8.

Figure 7:
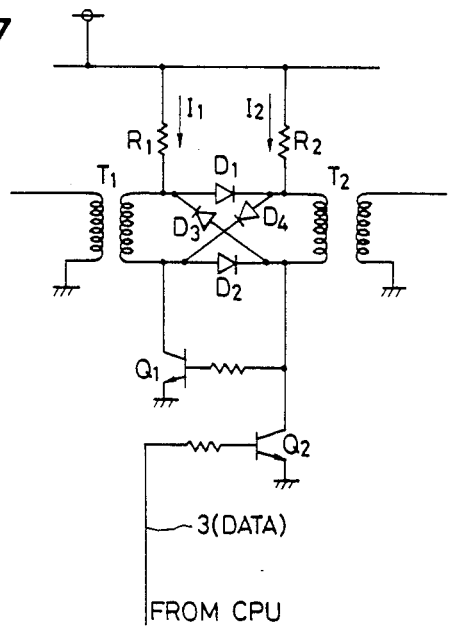
FIG. 7 is an example of a circuit element of the PSK modulator according to this invention.

FIG. 7 shows an example of the circuit element of the PSK modulator. In FIG. 7, $D_1$, $D_2$, $D_3$ and $D_4$ represent diodes; $Q_1$ and $Q_2$, transistors; $T_1$ and $T_2$, transducers; and $R_1$ and $R_2$, resistors. A carrier amplified through the amplifier 2 is inputted through the transducer $T_1$ to the PSK modulator, and PSK-modulated signal is outputted through the transducer $T_2$ to the amplifier 7. When the level of the data is $V_H(1)$, the transistor $Q_2$ is in an ON-state and the transistor $Q_1$ is in an OFF-state, to thereby make the diodes $D_1$ and $D_2$ conductive (low resistance) and the diodes $D_3$ and $D_4$ nonconductive (high resistance). Accordingly, a current $I_1$ flowing into the resistor $R_1$ is divided into two currents, one of which flows through the diode $D_1$ and the transducer $T_2$ to the transistor $Q_2$ and the other of which flows through the transducer $T_1$ and the diode $D_2$ to the transistor $Q_2$. Further, a current $I_2$ flowing into the resistor $R_2$ flows through the transducer $T_2$ to the transistor $Q_2$. When an alternating signal is inputted to the transducer $T_1$ in the above condition, an output signal of the transducer $T_2$ is inverted in phase by 180 degrees. Similarly, when the level of the data 3 is $V_L(1)$, the transistor $Q_1$ is in an ON-state and the transistor $Q_2$ in an OFF-state. In this case, the current $I_2$ is divided into two currents, one of which flows through $T_2$, $D_3$ and $T_1$ to $Q_1$, and the other of which flows through $D_4$ to $Q_1$, and the current $I_1$ flows through $T_1$ to $Q_1$. As a result, the output signal is out-putted from the transducer $T_2$ in the same phase as the input signal to the transducer $T_1$.

Although the foregoing embodiment illustrates the case where the oscillation frequency $f_{osc}$ of the oscillator circuit 11 is twice as high as the carrier frequency $f_c$ and the frequency converter circuit 12 constituted the frequency divider is provided, a modification may be made wherein the oscillation frequency $f_{osc}$ is set at $\frac{1}{2}$ the carrier frequency $f_c$ and frequency conversion is performed by a multiplier.

As is apparent from the foregoing description, in the PSK transmitter according to the present invention, the oscillation frequency of the oscillator circuit is much different from the PSK carrier frequency, frequency conversion is performed by the frequency converter circuit provided in the transmission system, and the frequency converter circuit is ON/OFF controlled to obtain the PSK carrier frequency. Therefore, it is not necessary to provide a complicated and expensive switching circuit in the transmission system. Hence, it is made possible to obtain a PSK transmitter having a large DU ratio.

What is claimed is:

1. In a PSK transmitter in which PSK modulation is carried out on a carrier in the form of an oscillation signal to produce a modulated PSK signal, said PSK transmitter having an oscillation circuit for producing said oscillation signal, the improvement wherein an output oscillation signal of a frequency $f_{osc}$ of said oscillator circuit is set different from a frequency $f_c$ of a carrier signal and said output oscillation signal of frequency $f_{osc}$ is subjected to frequency conversion by a frequency converter before PSK modulation to thereby produce said carrier signal at said frequency $f_c$, said frequency converter being ON/OFF controlled by a switching signal having a first state for turning on said converter and a second state for turning off said converter so that an output of said converter is zero when said switching signal is in said second state, said ON/OFF control of said frequency converter means being carried out without provision of a separate switching stage, so as to maximize a desired-to-undesired signal ratio of said transmitter.

2. The PSK transmitter of claim 1, wherein said frequency $f_{osc}$ is twice said frequency $f_c$, and said frequency converter comprises a frequency divider.

3. The PSK transmitter of claim 1, wherein said frequency $f_{osc}$ is half said frequency $f_c$, and said frequency converter comprises a frequency multiplier.

4. A PSK transmitter comprising:

an oscillator producing an oscillation output signal at a frequency $f_{osc}$ different from a carrier frequency $f_c$;

frequency converter means receiving said oscillation output signal as an input signal and outputting a frequency converter signal at a frequency equivalent to said carrier frequency $f_c$;

means for supplying a switching signal to said frequency converter means to ON/OFF control said frequency converter means so that an output of said converter means is zero when said converter means is off;

first amplifying means for amplifying said frequency converter signal;

a PSK modulator for PSK modulating said amplified frequency converted signal with a data signal to produce a modulated carrier signal;

second amplifying means for amplifying said modulated carrier signal to produce an amplified modulated carrier signal; and filter means for receiving said amplified modulated carrier signal for allowing signals in a first frequency range to pass, and for blocking signals in a second frequency range, said ON/OFF control of said frequency converter means being carried out without provision of a separate switching stage, so as to maximize a desired-to-undesired signal ratio of said transmitter.

5. The PSK transmitter of claim 4, wherein said frequency $f_{osc}$ is twice said frequency $f_c$, and said frequency converter comprises a frequency divider.

6. The PSK transmitter of claim 4, wherein said frequency $f_{osc}$ is half said frequency $f_c$, and said frequency converter comprises a frequency multiplier.

* * * * *